United States Patent
Tempel et al.

(10) Patent No.: US 12,419,297 B2
(45) Date of Patent: Sep. 23, 2025

(54) FLUID MANAGEMENT FOR A TRAP DEVICE

(71) Applicant: BAYER AKTIENGESELLSCHAFT, Leverkusen (DE)

(72) Inventors: Matthias Tempel, Cologne (DE); Fabian Christian Born, Solingen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 411 days.

(21) Appl. No.: 17/920,381

(22) PCT Filed: Apr. 12, 2021

(86) PCT No.: PCT/EP2021/059386
§ 371 (c)(1),
(2) Date: Oct. 20, 2022

(87) PCT Pub. No.: WO2021/213824
PCT Pub. Date: Oct. 28, 2021

(65) Prior Publication Data
US 2023/0157270 A1    May 25, 2023

(30) Foreign Application Priority Data
Apr. 23, 2020   (EP) ..................................... 20171170

(51) Int. Cl.
*A01M 1/02* (2006.01)
*G06V 20/50* (2022.01)
*H04N 23/54* (2023.01)
*H04N 23/56* (2023.01)

(52) U.S. Cl.
CPC ............. *A01M 1/026* (2013.01); *G06V 20/50* (2022.01); *H04N 23/54* (2023.01); *H04N 23/56* (2023.01)

(58) Field of Classification Search
CPC .. A01M 1/026; A01M 1/02; A01M 2200/012; A01M 1/106; A01M 1/103; A01M 1/10; A01M 2200/011; A01M 99/00
See application file for complete search history.

(56) References Cited

U.S. PATENT DOCUMENTS

| | | | |
|---|---|---|---|
| 2012/0204477 A1* | 8/2012 | Fairleigh | A01M 1/103 43/121 |
| 2020/0037577 A1* | 2/2020 | Dzamba | A01K 5/025 |
| 2021/0360204 A1 | 11/2021 | Wollenhaupt et al. | |

FOREIGN PATENT DOCUMENTS

| | | |
|---|---|---|
| CN | 108308053 A | 7/2018 |
| DE | 202006001551 U1 | 3/2006 |
| EP | 1477056 A1 | 11/2004 |
| FR | 2719975 A1 | 11/1995 |
| WO | WO2020058170 A1 | 3/2020 |

OTHER PUBLICATIONS

PetSafe on Amazon https://www.amazon.com/PetSafe-Healthy-Station-System-Stainless/dp/B002RT8M9I?th=1 (Year: 2009).*

* cited by examiner

*Primary Examiner* — Richard G Davis
(74) *Attorney, Agent, or Firm* — Harness, Dickey & Pierce, P.L.C.

(57) ABSTRACT

The present invention relates to a device and a method for immobilizing and identifying pests. The present invention also relates to a device that can be filled with fluid to immobilize pests, means making sure that the level of the fluid in the device stays within defined limits.

21 Claims, 5 Drawing Sheets

FLUID MANAGEMENT FOR A TRAP DEVICE

CROSS-REFERENCE TO RELATED APPLICATIONS

Figure 1:
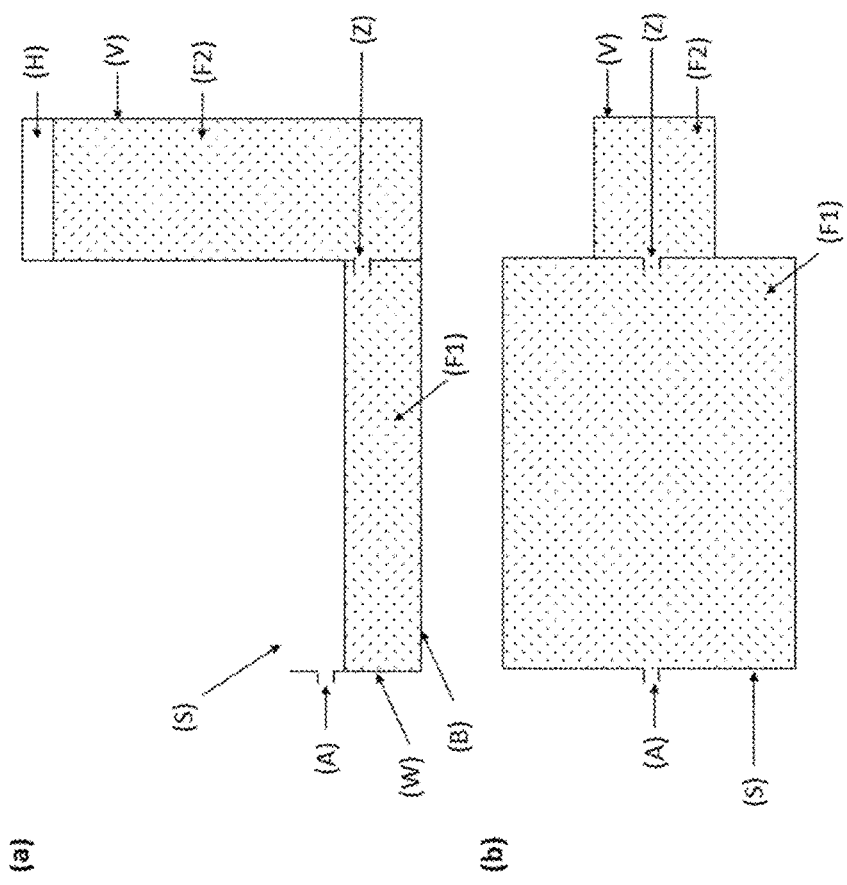

This application is a U.S. national stage filing under 35 U.S.C. § 371 of International Application No. PCT/EP2021/059386, filed on Apr. 12, 2021, which claims the benefit of, and priority to, European Application No. 20171170.2, filed on Apr. 23, 2020. The entire disclosure of each of the above applications is incorporated herein by reference.

The present invention relates to a device that can be filled with a fluid to immobilize pests, with means that ensure that the level of the fluid in the device remains within defined limits. The invention furthermore relates to a method for immobilizing pests for the purpose of identification.

About two thirds of the species currently known are arthropods (phylum of Arthropoda), 85% of which are insects. A considerable proportion of arthropods is phytophagous: these animals feed on plants and can lead to impairment of growth, cause suction and biting damage, and transmit viral diseases. This causes, for example, considerable losses of yield and quality in the growing of crop plants.

In modern agriculture, an important role is played by the detection and recognition of pests within areas utilized agriculturally.

WO2020058170 and WO2020058175 disclose trap dishes which can be filled with water and additives to immobilize pests. Such a trap dish may be fitted with a camera. The camera is mounted at a defined distance above the bottom of the dish such that an image of the bottom of the trap dish is projected onto a sensor of the camera. A drain on the side of the dish ensures that rain water that gets into the dish can drain away via the drain. Owing to the drain, the water in the dish does not rise above an upper level. However, water may evaporate from the dish and the dish may dry out. A dish that has dried out is no longer capable of immobilizing pests.

The present invention attends to this problem.

This problem is solved by the subjects of the independent claims. Preferred embodiments of the invention are found in the dependent claims, in the present description and in the figures.

A first subject of the present invention is a device for immobilizing pest, comprising
  a dish for holding a fluid,
  a storage container for holding a fluid, the storage container and the dish being connected to each other via a fluid connection,
  means for filling the dish with fluid from the storage container, where the fluid transfers automatically from the storage container via the fluid connection into the dish when the fluid in the dish drops below a defined level.

A further subject of the present invention is a method comprising the steps of:
  providing a device, where the device comprises:
    a dish for holding a first fluid
    a storage container for holding a second fluid, the storage container and the dish being connected to each other via a fluid connection,
  filling the dish with the first fluid and the storage container with the second fluid, where the second fluid transfers automatically via the fluid connection into the dish when the first fluid in the dish drops below a defined level,
  identifying a pest located in the dish.

A further subject of the present invention is the use of a device for immobilizing and/or identifying pests, preferably in an area where crop plants are cultivated, the device comprising:
  a dish for holding a fluid,
  a storage container for holding a fluid, the storage container and the dish being connected to each other via a fluid connection,
  means for filling the dish with fluid from the storage container, where the fluid transfers automatically via the fluid connection into the dish when the fluid in the dish drops below a defined level.

The invention is described in more detail below without distinguishing between the aspects of the invention (device, method, use). The explanations that follow shall instead apply analogously to all subjects of the invention, regardless of the context (device, method, use) in which they are provided.

Where steps are stated in an order in the present description or in the claims, this does not necessarily mean that the invention is limited to the order stated. Instead, it is conceivable that the steps are also executed in a different order or else in parallel with one another, unless one step builds on another step, which absolutely requires that the step building on the previous step be executed subsequently (which will however become clear in the individual case). The orders stated are thus preferred embodiments of the invention.

The device according to the invention, its construction and mode of operation can be described particularly clearly on the basis of a device which contains at least one fluid and is set up or suspended or otherwise fixed in one place. However, this is not meant to imply that the invention is limited to a fluid-filled and fixed device. For example, a device according to the invention is usually offered as a sales product without any fluid already contained therein and the device is usually not already fixed in place as a sales product. Nevertheless, a corresponding sales product is to be protected by the present intellectual property right. Thus, when reference is made to one or more fluids in the description and/or definition of the device according to the invention, or the device is described in a defined position, the scope of protection is of course also intended to cover a device without any fluid in any position.

The invention serves to immobilize pests. A "pest" is preferably understood to mean a mobile organism which can appear in the growing of plants and damage the plants, or adversely affect the harvest of the plants. The pest is preferably an insect (in the various stages from larva (caterpillar, pseudo-caterpillar) up to the adult stage) or an arachnid.

Pests have to be "mobile" in the sense that they can autonomously enter the dish of the device.

The term "immobilize" means that pests that enter the device cannot leave it autonomously again, at least not for a certain period of time. In the defined period of time, one or more image recordings of the pests located in the device can be produced with the aid of a camera to identify the pests depicted in the image recordings.

The device has a dish within which pests are immobilized. This is preferably achieved by means of a (first) fluid in the dish. Pests that get into the fluid are usually no longer able to leave it autonomously or are at least retained by the fluid for a certain period of time. It is conceivable that pests drown in the fluid.

The (first) fluid is usually water, to which one or more additives may have been added. Such an additive may, for example, be a surfactant for lowering surface tension. Such an additive may also be an attractant for attracting (specific) pests. Such an additive may also be a means of preventing algae formation (for example a herbicide). Further additives are conceivable.

The dish has a bottom and walls. The bottom limits the dish in one spatial direction ("downwards"). In the opposite spatial direction ("upwards") the dish is usually open so that pests can get into the dish. To the sides, the dish is limited by walls. When a dish is filled with a fluid, the fluid remains in the dish because the bottom and the walls prevent it from flowing out. A dish in the sense of the present invention may, for example, have the shape of a cylinder with one of the bases of the cylinder missing (a cylinder open to one side). A dish in the sense of the present invention may, for example, have the shape of a cone or a truncated cone with the base of the cone or a base of the truncated cone (preferably the one having the larger surface area) missing. In the case of a cone-shaped dish, the base of the dish is confined to one point (the apex of the cone). A dish in the sense of the present invention may, for example, have the shape of a cuboid with a base of the cuboid missing. A dish in the sense of the present invention may, for example, have the shape of a truncated pyramid with a base of the truncated pyramid (preferably the one having the larger surface area) missing. Further shapes, in particular mixed shapes of the shapes mentioned, are conceivable.

The bottom may be flat or curved. Preferably, the bottom is flat. A flat bottom has the advantage that all regions of the bottom can be sharply imaged on a camera.

The bottom can be smooth or have a structure. Such a structure may comprise elevations and/or depressions in the surface of the bottom. A structure has the advantage that pests in the fluid do not easily form clusters (do not easily stick together in groups) as a result of movement of the fluid.

The bottom may have (in top view) a round, oval, elliptical, polygonal (trigonal, tetragonal, pentagonal, hexagonal or generally n-gonal, with n being an integer greater than or equal to three) or other shape. Preferably, the bottom (in top view) has a round or rectangular (in particular square) shape. A rectangular shape has the advantage that the dish (or the bottom of the dish and/or the fluid surface of a fluid in the dish) can be imaged over its entire surface on a camera sensor, thereby making optimum use of the camera sensor. Particularly preferred is therefore a dish with an aspect ratio that corresponds to the aspect ratio of the camera sensor (e.g. 4:3, 3:2, 16:9 or another common format). Preferably, the corners are rounded. A round dish or a dish with rounded corners has the advantage that it is easier to clean than a dish with corners.

The walls preferably extend conically or cylindrically at an angle to the bottom surface in the range of 60° to 120°, preferably in the range of 80° to 120°, still more preferably in the range of 90° to 110° from the bottom, so that the bottom and the walls form a space which is open to one side (to the "top") but is otherwise delimited from the environment by the bottom and the walls. This space serves to hold the fluid. In the present description, this space is also referred to as the interior of the dish.

If fluid is introduced into the interior of the dish, the volume of fluid in the interior of the dish defines a collecting region in which pests can collect. The pests can float on the surface of the fluid, float in the volume of the fluid and/or sink to the bottom of the dish in the volume of the fluid. The volume of the collecting region is delimited on one side by the bottom of the dish, on other sides by the walls of the dish and on the open side of the dish by the fluid surface.

For the use according to the invention, the device according to the invention is usually set up, suspended or otherwise fixed in a place. In doing so, the device is oriented such that the preferably flat bottom of the dish extends preferably horizontally, i.e. parallel to the flat underground. In other words, the surface normal (the perpendicular to the flat bottom surface of the dish) points in the direction of the centre of the earth.

The device according to the invention further comprises a storage container. The storage container is for holding a (second) fluid.

The (second) fluid is typically water, to which one or more additives may be added. Such an additive may, for example, be a surfactant for lowering surface tension. Such an additive may also be an attractant for attracting (specific) pests. Such an additive may also be a means of preventing algae formation (for example a herbicide). Further additives are conceivable.

In this description, the fluid (initially) placed in the dish is referred to as the first fluid, while the fluid (initially) placed in the storage container is referred to as the second fluid. However, this does not necessarily mean that the first fluid and the second fluid are different fluids. Preferably, the first fluid and the second fluid are miscible in any ratio; i.e. they produce a homogeneous mixture. Preferably, the first fluid and the second fluid are the same fluid.

Preferably, a colorant is added to either the first fluid or the second fluid. This has the advantage that, in an image recording produced by the camera, it is possible to estimate from the intensity of the color of the fluid in the dish how much second fluid has already passed from the storage container into the dish. Thus, a user of the device according to the invention can remotely estimate whether a refill of the storage container is required based solely on the images taken by the camera. This may be illustrated by an example in which the first fluid is colorless, while the second fluid comprises a dye and thus has a color. However, the invention is not intended to be limited to this example. Usually, the more dye there is in the fluid, the greater the intensity of the color. Now, if colored fluid from the storage container enters the dish containing colorless fluid, the colored fluid is diluted. The more colored fluid enters the dish from the storage container, the greater the intensity of the color of the fluid in the dish. The intensity of the color, which can be determined from an image recording, thus indirectly gives an indication of the amount of fluid that has already entered the dish from the storage container. This also applies analogously to the case where the first fluid comprises a dye while the second fluid is colorless. Of course, it is also conceivable that both fluids comprise a dye and the amount of fluid that has entered the dish from the storage container can be read from the mixed color.

For holding the (second) fluid, the storage container comprises a storage container interior which is delimited by walls.

The storage container preferably has at least one reversibly closable filling opening through which the storage container can be filled with a (second) fluid. The reversibly closable filling opening can be closed, for example, by means of a screw cap, a plug, a flange or other closing means. Preferably, seals are provided to close the filling opening in an airtight manner Preferably, the sealing means (including the seals, if present) withstand a pressure of at least 0.1 bar.

The storage container and the dish are connected to each other via a fluid connection. The fluid connection allows (the second) fluid to pass from the storage container to the dish.

The fluid connection can be one or more openings in one or more walls of the storage container, through which fluid can exit the interior of the storage container and enter the interior of the dish. It is also conceivable that storage container and dish are connected to each other via one or more pipes and/or hoses and/or channels.

In a preferred embodiment, at least one drain is provided in at least one of the walls of the dish so that, for example, rainwater that enters the dish can (directionally) drain out of the dish via the at least one drain. The drain can be one or more drain openings in one or more walls of the dish. It is conceivable that a drain channel is attached to such a drain opening in order to direct the fluid flowing off in a defined direction. In the use of the device according to the invention, the dish is usually filled with a (first) fluid, the level of the fluid (the fluid level) being below the drain.

The at least one drain prevents the level of the fluid in the dish from rising above a defined (upper) threshold when the dish is filled with fluid.

Furthermore, means are present to prevent the level of the fluid in the dish from falling below a defined (lower) threshold (for example due to evaporation). This can be achieved in various ways.

In a preferred embodiment, the storage container or at least the fluid connection between the storage container and the dish protrudes into the dish interior. In this preferred embodiment, the storage container container has, for example, one or more openings connecting the interior of the dish to the interior of the storage container. The one or more openings are preferably located between the bottom of the dish and the at least one drain of the dish (if present), or that end of the walls of the dish that faces away from the bottom and is the shortest distance from the bottom. Here, the interior of the storage container preferably extends beyond said end of the walls. An example of this embodiment is shown schematically in FIG. 1.

FIG. 1 (a) shows a device according to the invention in cross-section from one side, FIG. 1 (b) shows the device according to the invention in cross-section in a top view.

The embodiment of the device according to the invention shown in FIG. 1 comprises a dish (S) and a storage container (V). Dish (S) is filled with a first fluid (F1). Storage container (V) is filled with a second fluid (F2). A major part of the storage container interior is above the level of the first fluid (F1) in dish (S). A drain (A) is fitted in a wall (W) of dish (S). If, for example, rainwater enters the interior of the dish, the level of the first fluid (F1) in the interior of the dish rises until it reaches drain (A), after which any additional fluid drains off via drain (A). Drain (A) thus ensures that the level of the first fluid (F1) in the interior of the dish does not exceed the level of drain (A). Storage container (V) and dish (S) are connected to each other via a fluid connection (Z). The second fluid (F2) can enter dish (S) from storage container (V) via fluid connection (Z). Storage container (V) is otherwise closed. If the second fluid (F2) flows from storage container (V) via fluid connection (Z) into dish (S), a negative pressure is created in the head region (H) of storage container (V). This negative pressure prevents further fluid (F2) from flowing from storage container (V) via fluid connection (Z) into dish (S). Only when the level of fluid (F1) in dish (S) drops below the fluid connection (Z) can air flow through fluid connection (Z) into storage container (V) and ensure pressure equalisation. Fluid (F2) then flows from storage container (V) through fluid connection (Z) into dish (S) and at the same time air from the surroundings of the device penetrates through fluid connection (Z) into storage container (V); the level of fluid (F1) in dish (S) rises. However, the level of fluid (F1) in the dish only rises until the level of fluid (F1) rises above fluid connection (Z) and closes fluid connection (Z). Then no more air can enter storage container (V) and provide pressure equalisation. A negative pressure is created in head region (H) of storage container (V), which prevents further outflow of fluid (F2) from storage container (V) into dish (s). This solution according to the invention thus ensures that dish (S) does not dry out so quickly. As long as there is fluid (F2) in storage container (V) that can flow into dish (S), dish (S) will not dry out.

Apart from rainwater or other sources of fluid in the surroundings of the device, only fluid from the storage container can enter the dish. If the level of fluid in the dish drops to a lower level at which air from outside can flow into the storage container and equalise the pressure there, fluid flows from the storage container into the dish until the level of fluid in the dish reaches an upper level at which air from outside can no longer enter the storage container and equalise the pressure there. As long as there is still fluid in the storage container, the fluid level in the dish moves between a lower and an upper level. The size of this range is determined by the size and shape of the fluid connection (or the opening between the storage container and the dish) and by the surface tension of the fluid.

Preferably, a grid or a net or a sponge or a bubbling stone (as used, for example, in aquaristics to produce fine gas bubbles, see e.g. DE202006001551 U1) is introduced in the fluid connection between the storage container and the dish. Such a flow regulator has the advantage of regulating the air flowing into the storage container in the event of pressure equalisation and thus reducing or preventing larger air bubbles, air surges and associated pressure waves within the fluid.

Figure 2:
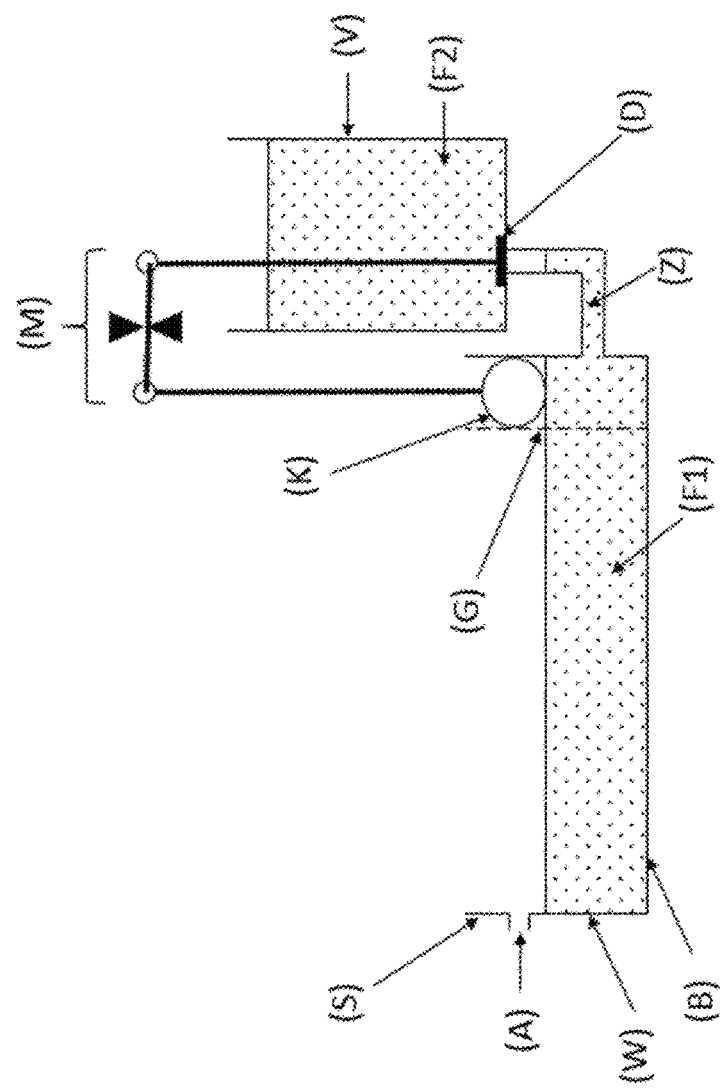
Figure 3:
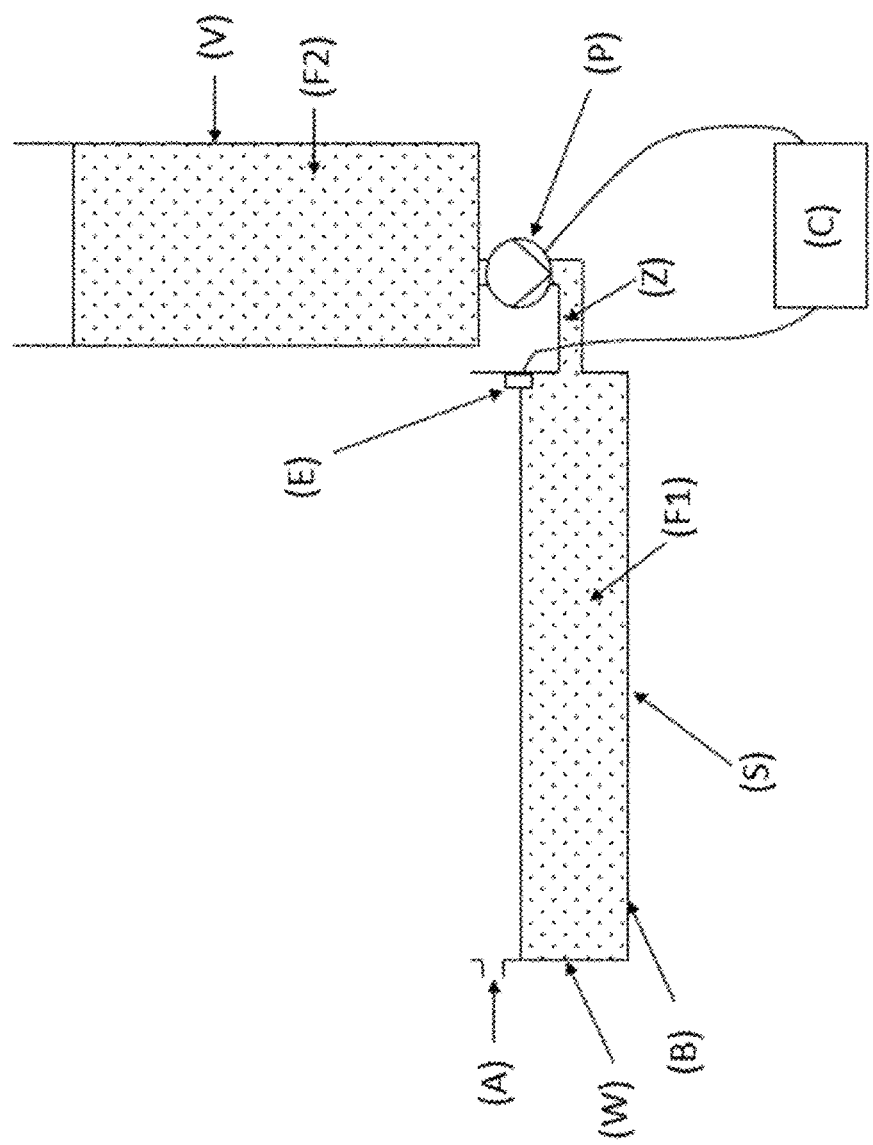

Preferably, the volume of the storage container interior is larger than the volume in the dish that can be occupied by a fluid (the volume of the collecting region)—even if FIGS. 1, 2 and 3 give a different impression.

Preferably, the filling opening for filling and/or refilling the storage container with a fluid is provided in a wall in the head region of the storage container. As already mentioned, the filling opening is preferably reversibly closable.

Preferably, the fluid connection between the dish and the storage container is (also) designed to be reversibly closable. Preferably, the closure of the filling opening and the closure of the fluid connection cooperate in such a way that the fluid connection can only be opened when the filling opening is closed. This prevents the storage container from unintentionally running empty (e.g. when filling up). This interaction can be achieved, for example, by a slider. The slider is actuated either manually or automatically when the filling opening is opened and closed. The slider can assume two states, a first state when the filling opening is open and a second state when the filling opening is closed. In the first state, the slider blocks the opening mechanism to open the fluid connection; in the second state, the slider releases the opening mechanism to open the fluid connection.

FIG. 2 shows a further preferred embodiment of the device according to the invention in cross-section in a side view. A float (K) is introduced into dish (S) and floats on (in) fluid (F). Float (K) is separated from the rest of the interior of the dish by a grid (G). Grid (G) serves to guide float (K); grid (G) prevents sideways movement of float (K); float (K) can only move upwards (away from the bottom (B) of dish (S)) or downwards (towards the bottom (B) of dish (S)) owing to grid (G). Fluid (F1) in the dish can pass through grid (G). The device further comprises a storage container (V) connected to dish (S) via a fluid connection (Z). In the bottom region of storage container (V) there is an opening leading to fluid connection (Z). This opening is closed by a closure (D). Closure (D) is connected to float (K) via a lever mechanism (M). If the level of fluid (F1) in dish (S) sinks, float (K) sinks towards the bottom. At the same time, float (K) pulls on closure (D) via lever mechanism (M), which frees the opening in the bottom region of the storage tank. Fluid (F2) can flow from storage container (V) through the opening and fluid connection (Z) into dish (S). This causes the level of fluid (F1) in dish (S) to rise, and float (K) also rises. At the same time, float (K) pushes closure (D) downwards via lever mechanism (M) and closure (D) closes the opening in the bottom area of storage container (V). This has the effect that no further fluid (F2) can flow from storage container (V) into dish (S). Float (K) in combination with lever mechanism (M) and shutter (D) thus ensures that fluid (F2) flows into the dish as soon as the level of fluid (F1) falls below a lower threshold. Drying out of dish (S) is prevented. The principle shown in FIG. 2 is also used, for example, in flush tanks for toilets in order to refill the flush tanks with water after a toilet flush. There are numerous different configurations. All of these configurations can also be realised in the device according to the invention. The following documents provide an overview of various configurations. By reference, these documents are incorporated in their entirety into the present description: EP0731230A, EP1719845A, EP1580338A, EP0915210A, EP0424622A, EP2141294A, EP0185940A, EP3400342A, DE3153689A, DE19647779A, AT520940, DE102010035946A, EP2700759A.

FIG. 3 shows a schematic of a further embodiment of the device according to the invention, in a side view. A sensor (E) is mounted in dish (S). If the level of fluid (Fl) in dish (S) drops below a lower threshold, sensor (E) transmits a first signal to a control and monitoring unit (C). Control and monitoring unit (C) activates a pump (P) when the first signal is reached. By means of pump (P), fluid (F2) is conveyed from storage container (V) into dish (S). This causes the level of fluid (F1) in dish (S) to rise. When the level of fluid (F1) in dish (S) reaches an upper threshold, sensor (E) transmits a second signal to control and monitoring unit (C). Control and monitoring unit (C) switches off pump (P) when the second signal is reached, so that no further fluid (F2) is conveyed from storage container (V) into dish (S). It is also conceivable that fluid (F2) is not conveyed into the dish by means of a pump (P), but flows into dish (S) on its own due to gravity. In such a case, the pump can be replaced by a valve that is opened by control and monitoring unit (C) when the level of fluid (F1) in dish (S) drops below a lower threshold and is closed when fluid (F1) in dish (S) reaches an upper threshold. It is conceivable that two different sensors are present: a first sensor that registers when the level of fluid (F1) in dish (S) falls below a lower threshold, and a second sensor that registers when the level of fluid (F1) in dish (S) reaches an upper threshold.

It is conceivable to combine the embodiments shown in FIGS. 1 to 3. For example, it is conceivable that the float shown in FIG. 2 actuates a switch via which a valve is opened or closed, or via which the pump shown in FIG. 3 is switched on or off. Further combinations are conceivable.

In a preferred embodiment, the device according to the invention comprises at least one camera and/or at least one mount for at least one camera.

Such a camera can be used to generate digital images. Such a camera comprises an image sensor (camera sensor) and optical elements. The image sensor is a device for recording two-dimensional images from light by electrical means. This typically comprises semiconductor-based image sensors, for example CCD (CCD=charge-coupled device) or CMOS sensors (CMOS=complementary metal-oxide-semiconductor). The optical elements (lenses, stops and the like) serve for maximum sharpness of imaging of the object of which a digital image is to be generated on the image sensor.

The at least one mount and/or the at least one camera is/are positioned such that the entire collecting region or at least a part of the collecting region is imaged on the at least one image sensor. It is conceivable to use several cameras that image different areas of the collecting region on the respective image sensor. When using several cameras in this way, it is advantageous if the imaged areas at least partially overlap in order to be able to generate an overall image more easily from the individual image recordings at a later time.

At least one camera can preferably be reversibly fixed to the at least one mount. The at least one mount is preferably at a defined and constant distance from the collecting region, and hence ensures a defined and constant distance between the at least one image sensor and the collecting region.

It is conceivable that the device according to the invention is equipped with at least one source of electromagnetic radiation, preferably in the visible, infrared and/or ultraviolet range of the spectrum. With such a source of electromagnetic radiation, the collecting region can be illuminated so that digital image recordings of constant quality can be produced regardless of sunlight (i.e. also at night, for instance).

The digital images of the collecting region produced by the at least one camera can be analysed by an expert or by a self-learning system to decide whether there is a pest in the collecting region and to identify a pest present in the collecting region. Details of this can be found, for example, in the following publications: WO2020058170, WO2020058175, WO2018054767, KR1020100127473, WO0217119, O. Lopez et al.: *Monitoring Pest Insect Traps by Means of Low-Power Image Sensor Technologies*; Sensors 2012, Vol. 12 No. 12 pages 15801-15819.

In a preferred embodiment, the device according to the invention has an energy supply, for example to supply an existing camera and/or an existing pump and/or an existing control and monitoring unit and/or an electrically controllable valve with electrical energy. The energy supply can be, for example, an electrochemical cell (battery), a rechargeable battery, a solar panel, a fuel cell, a wind turbine with a generator and/or another source of electrical energy or a combination of the units mentioned.

Preferably, the device of the invention has means by which the device can be located on a ground surface or in a ground surface. The device can preferably be secured in the ground surface in order to prevent it from falling over, for example in a storm. There are preferably means by which the distance between ground surface and collecting region can be varied. One example of such a height adjustment is a telescopic rod that can be secured in the ground surface by one end, and the collecting region can be mounted at the other end thereof. Another example of a height adjustment is a lifting platform. Such a variable height adjustment enables positioning of the collecting region above plants, such that flying insects can recognize the collecting region when flying over the plants. The variable height adjustment allows adjustment of the height of the collecting region (distance from the ground surface) to the growing plants in order to prevent the surrounding plants from covering the collecting region. In a preferred embodiment, the height adjustment is automatic; however, manual height adjustment is also possible. The height is preferably automatically adjusted such that the collecting region is always above or at the height of the surrounding plants. This can be accomplished by distance sensors and/or brightness sensors.

However, it is also conceivable that the device according to the invention has means by which it can be attached to a plant or another object, for example by means of a hook or a loop or a strap for attachment to a branch or twig or trunk.

In a preferred embodiment, the device according to the invention comprises a transmission unit with which camera images can be transmitted to a separate computer system. This transmission may, for example, take place via a network such as the mobile telephone network.

The device according to the invention may have further features, in particular features described in the disclosure WO2020058170 and/or the disclosure WO2020058175. By reference, said disclosures are hereby incorporated herein in their entirety.

Figure 4:
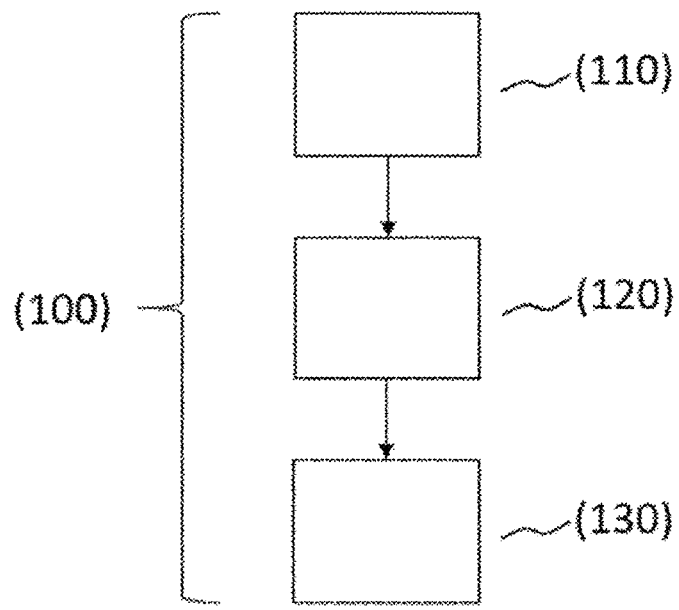

FIG. 4 shows an embodiment of the method according to the invention in the form of a flow chart.

The method (100) comprises the steps of:
(110) providing a device, where the device comprises:
a dish for holding a first fluid
a storage container for holding a second fluid, the storage container and the dish being connected to each other via a fluid connection,
(120) filling the dish with the first fluid and the storage container with the second fluid, where the second fluid transfers automatically from the storage container via the fluid connection into the dish when the first fluid in the dish drops below a defined level,
(130) identifying a pest located in the dish.

The term "identify" may mean that an object in the dish is recognized as a pest on the basis of defined characteristics. This may involve recognising a specific pest or a specific pest (e.g. in terms of the particular phylum, class, order, family, genus and/or species); it is also conceivable that only a statement is made that the object is a pest or not a pest.

Preferably, the identification is carried out with the help of a camera that produces a digital image recording of the object in the dish.

Figure 5:
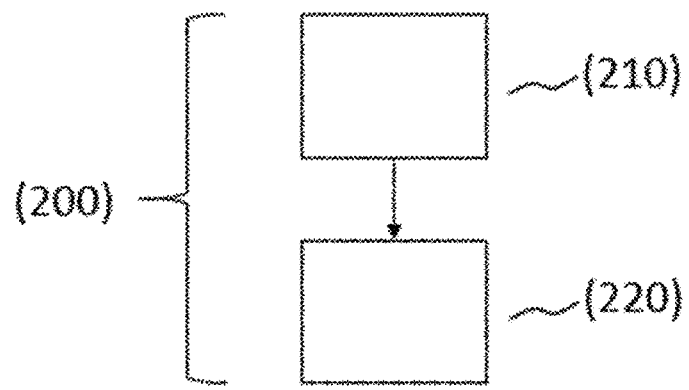

FIG. 5 shows a further embodiment of the method according to the invention in the form of a flow chart. The method (200) comprises the steps of:
(210) providing a device, where the device comprises:
a dish, the dish being filled with a first fluid,
a storage container, the storage container being filled with a second fluid, the storage container and the dish being connected to each other via a fluid connection, where the second fluid automatically transfers from the storage container via the fluid connection to the dish when the first fluid in the dish drops below a defined level,
a camera having an image sensor, the camera being mounted at a defined distance from the dish, where an image of the first fluid is produced on the image sensor,
(220) generating a digital image recording of a pest in the first fluid by means of the camera.

Figure 6:
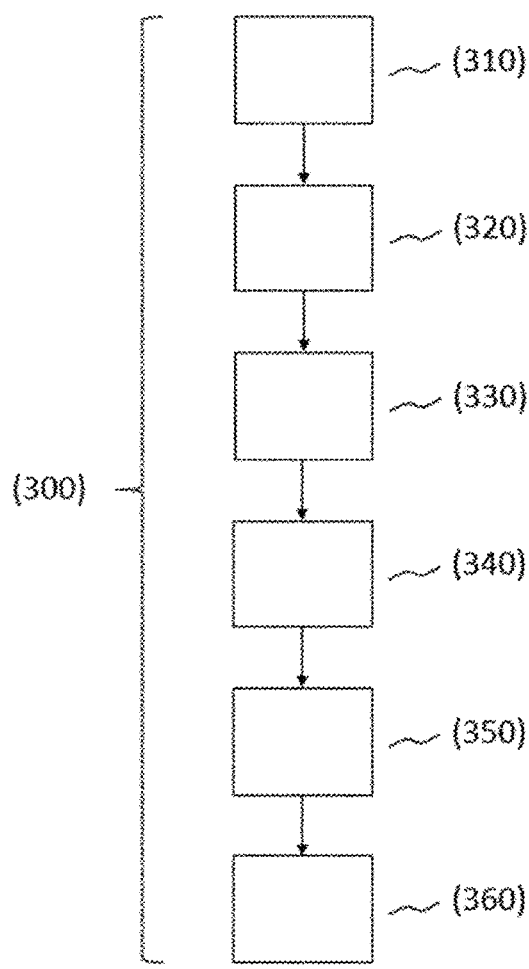

FIG. 6 shows a further embodiment of the method according to the invention in the form of a flow chart. The method (300) comprises the steps of:
(310) fixing a device in a place, the device comprising:
a dish for holding a fluid,
a storage container for holding a fluid, the storage container and the dish being connected to each other via a fluid connection, where the fluid connection is reversibly closable, where the storage container comprises a reversibly closable filling opening,
(320) closing the fluid connection,
(330) opening the filling opening after closure of the fluid connection,
(340) filling the dish and the storage container with a fluid, the storage container being filled via the opened filling opening,
(350) closing the filling opening after the storage container has been filled,
(360) opening the fluid connection after closure of the filling opening.

Figure 7:
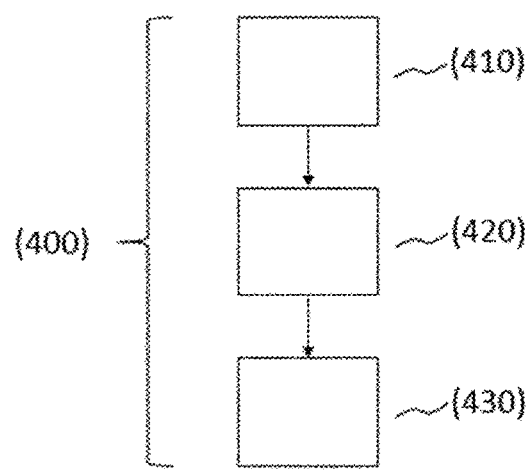

FIG. 7 shows a further embodiment of the method according to the invention in the form of a flow chart. The method (400) comprises the steps of:
(410) fixing a device in a place, the device comprising:
a dish for holding a first fluid,
a storage container for holding a second fluid, the storage container and the dish being connected to each other via a fluid connection,
a mount for holding a camera
(420) filling the dish with the first fluid and the storage container with the second fluid, where the second fluid transfers automatically from the storage container via the fluid connection into the dish when the first fluid in the dish drops below a defined level,
(430) attaching a camera at the mount.

Instead of the sequence of steps (410)→(420)→(430) shown in FIG. 7, the sequences (410)→(430)→(420), (420)→(430)→(410), (420)→(410)→(430), (430)→(420)→(410) and (430)→(410)→(420) are of course also conceivable.

What is claimed is:

1. A device comprising:
a dish for receiving a first fluid, wherein the dish includes a dish interior for holding the first fluid, the dish comprising walls, the walls comprising at least one drain for incoming rainwater;
a storage container for holding a second fluid, the storage container and the dish being connected to each other via a fluid connection, wherein the storage container includes a storage container interior for holding the second fluid, wherein the storage container interior is connected to the dish interior via at least one opening to facilitate the fluid connection, the at least one opening being located at a level which is between the bottom of the dish and the drain, the storage container being otherwise closed or having at least one filling opening being reversibly closable with a first closure;
means for filling the dish with the second fluid from the storage container, where the second fluid transfers automatically from the container via the fluid connection into the dish when the first fluid in the dish drops below a defined level;
a mount for a camera, or a camera; and
a flow regulator in the form of a grid, a net, a sponge and/or a bubbling stone introduced into the at least one opening.

2. The device as claimed in claim 1 wherein the storage container includes the at least one filling opening and the first closure;
wherein the device comprises a second closure with which the at least one opening can be reversibly closed, the second closure cooperating with the first closure in such a way that the at least one opening can only be opened when the at least one filling opening is closed.

3. The device as claimed in claim 1, wherein the device comprises a float, the float being connected to a closure at the at least one opening, the closure reversibly closing the fluid connection between the dish and the storage container at the at least one opening, the float being vertically movable, the float being arranged such that it exerts a force on the closure when a height of the float falls below a lower height threshold, the force causing the fluid connection to open.

4. The device as claimed in claim 3, wherein the float is arranged such that it exerts another force on the closure when an upper height threshold is reached by the float, causing the fluid connection to be closed.

5. The device as claimed in claim 1, wherein the device has at least one sensor, a control and monitoring unit, and a pump and/or valve in the fluid connection, wherein the at least one sensor is mounted in the dish, wherein the at least one sensor is configured to transmit a first signal to the control and monitoring unit when the first fluid in the dish descends to a lower level, and to transmit a second signal to the control and monitoring unit when the first fluid in the dish rises to an upper level, wherein the control and monitoring unit is configured to turn on the pump and/or open the valve upon receiving the first signal and to turn off the pump and/or close the valve upon receiving the second signal.

6. The device as claimed in claim 1, wherein the device comprises a float, wherein the float floats in the first fluid in the dish, wherein the float is connected to a switch, wherein the float actuates the switch when the float descends to a lower level, wherein actuating the switch turns on a pump and/or opens a valve, wherein turning on the pump and/or opening the valve causes the second fluid from the storage container to enter the dish.

7. The device as claimed in claim 1, wherein the device comprises the camera having an image sensor, the image sensor having a rectangular shape with an aspect ratio, the dish having a rectangular shape, the rectangular shape of the dish having an aspect ratio corresponding to the aspect ratio of the image sensor of the camera.

8. The device as claimed in claim 7, wherein corners of the dish are rounded.

9. The device as claimed in claim 1, wherein the device comprises a source of electromagnetic radiation, the source of electromagnetic radiation being arranged to illuminate the first fluid in the dish and/or the second fluid in the storage container.

10. The device as claimed in claim 9, wherein the source of electromagnetic radiation is in the infrared and/or visible range.

11. The device as claimed in claim 1, wherein the dish comprises a flat bottom.

12. A method comprising the steps of:
providing a device, where the device comprises:
a dish for holding a first fluid, wherein the dish includes a dish interior for holding the first fluid, the dish comprising walls, the walls comprising at least one drain for incoming rainwater;
a storage container for holding a second fluid, the storage container and the dish being connected to each other via a fluid connection, wherein the storage container includes a storage container interior for holding the second fluid, wherein the storage container interior is connected to the dish interior via at least one opening to facilitate the fluid connection, the at least one opening being located at a level which is between the bottom of the dish and the drain, the storage container being otherwise closed or having at least one filling opening being reversibly closable with a first closure;
means for filling the dish with the second fluid from the storage container, where the second fluid transfers automatically from the container via the fluid connection into the dish when the first fluid in the dish drops below a defined label;
a mount for a camera and/or a camera; and
a flow regulator in the form of a grid, a net, a sponge and/or a bubbling stone introduced into the at least one opening;
filling the dish with the first fluid and the storage container with the second fluid, where the second fluid transfers automatically from the storage container via the at least one opening of the fluid connection into the dish when the first fluid in the dish drops below a defined level;
identifying a pest located in the dish.

13. The method as claimed in claim 12, further comprising the step of:
attaching the camera at the mount of the device.

14. The method as claimed in claim 13, further comprising the step of:
generating, the camera, one or more digital images of a region within the dish in which the first fluid is located, the region comprising one or more pests.

15. The method as claimed in claim 12, further comprising the steps of:
fixing the device in a place, where the fluid connection is reversibly closable at the at least one opening, where the storage container comprises a reversibly closable filling openings;
closing the fluid connection;
opening the filling opening after closure of the fluid connections;
filling the dish with the first fluid and the storage container with the second fluid, the storage container being filled via the opened filling openings;
closing the filling opening after the storage container has been filled;
opening the fluid connection after closure of the filling opening.

16. The method of claim 12, further comprising the step of positioning the device in an area where crop plants are cultivated.

17. A device comprising:
a dish for receiving a first fluid;
a storage container for holding a second fluid, the storage container and the dish being connected to each other via a fluid connection;
means for filling the dish with the second fluid from the storage container, where the second fluid transfers automatically from the container via the fluid connection into the dish when the first fluid in the dish drops below a defined level;
a mount for a camera and/or a camera; and
a float connected to a closure, the closure reversibly closing the fluid connection between the dish and the storage container, the float being vertically movable, the float being arranged such that it exerts a force on the closure when a height of the float falls below a lower height threshold, the force causing the fluid connection to open.

18. The device as claimed in claim 17, wherein the float is arranged such that it exerts another force on the closure when an upper height threshold is reached by the float, causing the fluid connection to be closed.

19. A device comprising:
a dish for receiving a first fluid;
a storage container for holding a second fluid, the storage container and the dish being connected to each other via a fluid connection;
means for filling the dish with the second fluid from the storage container, where the second fluid transfers automatically from the container via the fluid connection into the dish when the first fluid in the dish drops below a defined level;
a mount for a camera and/or a camera;
at least one sensor mounted in the dish;
a control and monitoring unit; and
a pump and/or a valve in the fluid connection;
wherein the at least one sensor is configured to transmit a first signal to the control and monitoring unit when the first fluid in the dish descends to a lower level, and to transmit a second signal to the control and monitoring unit when the first fluid in the dish rises to an upper level, wherein the control and monitoring unit is configured to turn on the pump and/or open the valve upon receiving the first signal and to turn off the pump and/or close the valve upon receiving the second signal.

20. A device comprising:
a dish for receiving a first fluid;
a storage container for holding a second fluid, the storage container and the dish being connected to each other via a fluid connection;
means for filling the dish with the second fluid from the storage container, where the second fluid transfers automatically from the container via the fluid connection into the dish when the first fluid in the dish drops below a defined level;
a mount for a camera and/or a camera;
a float that floats in the first fluid in the dish; and
a switch connected to the float;
wherein the float actuates the switch when the float descends to a lower level, wherein actuating the switch turns on a pump and/or opens a valve, wherein turning on the pump and/or opening the valve causes the second fluid from the storage container to enter the dish.

21. A device comprising:
a dish for receiving a first fluid;
a storage container for holding a second fluid, the storage container and the dish being connected to each other via a fluid connection;
means for filling the dish with the second fluid from the storage container, where the second fluid transfers automatically from the container via the fluid connection into the dish when the first fluid in the dish drops below a defined level; and
a camera having an image sensor, wherein the image sensor has a shape with an aspect ratio, and wherein a shape of the dish has an aspect ratio corresponding to the aspect ratio of the image sensor of the camera.

* * * * *